United States Patent
Asplund et al.

(10) Patent No.: US 8,345,457 B2
(45) Date of Patent: Jan. 1, 2013

(54) VOLTAGE SOURCE CONVERTER FOR HIGH VOLTAGE DIRECT CURRENT POWER TRANSMISSION

(75) Inventors: Gunnar Asplund, Solna (SE); Lars-Erik Juhlin, Ludvika (SE)

(73) Assignee: ABB Technology AG, Zürich (CH)

( * ) Notice: Subject to any disclaimer, the term of this patent is extended or adjusted under 35 U.S.C. 154(b) by 296 days.

(21) Appl. No.: 12/676,754

(22) PCT Filed: Sep. 5, 2007

(86) PCT No.: PCT/EP2007/059293
§ 371 (c)(1),
(2), (4) Date: Aug. 23, 2010

(87) PCT Pub. No.: WO2009/030275
PCT Pub. Date: Mar. 12, 2009

(65) Prior Publication Data
US 2010/0309698 A1 Dec. 9, 2010

(51) Int. Cl.
*H02M 7/5387* (2007.01)
*H02M 7/10* (2006.01)
(52) U.S. Cl. ............. 363/132; 363/68; 363/71; 363/125
(58) Field of Classification Search .................. 307/105; 363/39, 40, 44, 64, 65, 67, 68, 17, 125, 126, 363/127, 131, 132
See application file for complete search history.

(56) References Cited

U.S. PATENT DOCUMENTS

| | | | | |
|---|---|---|---|---|
| 5,262,935 A | * | 11/1993 | Shirahama et al. | 363/71 |
| 5,627,735 A | * | 5/1997 | Bjorklund et al. | 363/35 |
| 5,666,277 A | * | 9/1997 | Bjorklund et al. | 363/64 |
| 6,266,259 B1 | | 7/2001 | Franck | |
| 6,519,169 B1 | * | 2/2003 | Asplund et al. | 363/132 |
| 7,072,194 B2 | * | 7/2006 | Nayar et al. | 363/71 |
| 7,227,273 B2 | * | 6/2007 | Ahmad et al. | 290/40 C |
| 7,272,026 B2 | * | 9/2007 | Chou et al. | 363/131 |
| 2002/0024824 A1 | | 2/2002 | Reinold | |

FOREIGN PATENT DOCUMENTS

| | | |
|---|---|---|
| DE | 10103031 | 7/2002 |
| EP | 1184963 A | 3/2002 |

(Continued)

OTHER PUBLICATIONS

Michael P. Bahrman et al.; "The ABCs of HVDC transmission technologies"; IEEE power and energy magazine, vol. 4, No. 2, Mar./Apr. 2007; pp. 32-44.

(Continued)

*Primary Examiner* — Gary L Laxton
(74) *Attorney, Agent, or Firm* — Venable LLP; Eric J. Franklin

(57) ABSTRACT

A high voltage AC/DC or DC/AC power conversion system including a voltage source converter with at least two series-connected converter valve bridges, at least two reactors, where each of the reactors is connected to one of the AC phase terminals of the at least two bridges and at least one transformer connected to an AC supply voltage. In order to block a DC voltage from the at least one transformer, one of at least two capacitors is connected in series with each of the at least two reactors and is connected between the corresponding reactor and the at least one transformer.

7 Claims, 4 Drawing Sheets

FOREIGN PATENT DOCUMENTS

| WO | WO-96/09678 | 3/1996 |
| WO | WO-96/15573 A | 5/1996 |
| WO | WO-2007/016789 A1 | 2/2007 |

OTHER PUBLICATIONS

PCT/ISA/210—International Search Report—May 19, 2008.

PCT/ISA/237—Written Opinion of the International Searching Authority—May 19, 2008.

PCT/IPEA/409—International Prelimianry Report on Patentability—Dec. 23, 2009.

\* cited by examiner

US 8,345,457 B2

VOLTAGE SOURCE CONVERTER FOR HIGH VOLTAGE DIRECT CURRENT POWER TRANSMISSION

CROSS-REFERENCE TO RELATED APPLICATIONS

This application is the national phase under 35 U.S.C. §371 of PCT/EP2007/059293 filed 5 Sep. 2007.

FIELD OF THE INVENTION

The invention relates to a high voltage AC/DC or DC/AC power conversion system comprising a voltage source converter with at least two series-connected converter valve bridges and at least two reactors, where each of the reactors is connected to one of the AC phase terminals of the at least two bridges.

BACKGROUND OF THE INVENTION

In high voltage direct current (HVDC) power transmission systems, two basic power converter technologies are used to transform the voltage from AC to DC and vice-versa. One converter technology or type is the line-commutated current source converter (CSC) and the other technology is the force-commutated or self-commutated voltage source converter (VSC). An overview of today's HVDC systems including the two technologies as well as their applications is for example given in "The ABC of HVDC transmission technologies", IEEE Power & Energy Magazine March/April 2007, vol. 5, no. 2.

A simplified single-line diagram of a commonly known power conversion system with CSC, which is used in HVDC systems, is shown in FIG. 1. The CSC 1 comprises two three-phase, six-pulse bridges 2, each of the bridges 2 comprising six thyristor valves. The DC terminals of the two bridges 2 are connected in series and their DC output is coupled on one side to a DC transmission line or cable 3 and on the other side to ground 4. A DC filter 5 smoothes harmonics in the DC voltage. The AC terminals of the two bridges 2 are each connected via a transformer 6 to an AC bus 7. A shunt-connected AC filter 8 filters AC voltage harmonics.

In WO 96/09678, a power conversion system with CSC is disclosed, as shown in FIG. 2, which additionally to the system of FIG. 1 includes a series capacitor 9 in each of the phases, where the capacitors 9 are placed between the AC terminals of the two converter bridges 2 and the transformer. Instead of two two-winding transformers 6 a three-winding transformer 10 is used. The series capacitors 9 provide reactive power in order to compensate for the reactive power generated by the CSC 1.

Such reactive power compensation is not needed when a VSC instead of a CSC is used, since the VSC allows the independent control of active and reactive power so that the reactive power can be taken care of by the VSC control directly.

A simplified single-line diagram for a three-phase power conversion system with VSC, which is used in modern HVDC systems, is depicted in FIG. 3. The VSC 11 comprises converter valves 12 connected in a known six-pulse-bridge configuration, where the converter valves 12 each comprise an IGBT 13 (Insulated Gate Bipolar Transistor) in anti-parallel connection with a free-wheeling diode 14. The VSC 11 is connected on its AC side to a converter reactor 15, followed by a shunt-connected harmonic filter 16 and a transformer 17. The converter reactor 15 blocks harmonic currents arising from the switching of the VSC 11, and together with the harmonic filter 16 it protects transformer 17 from any high frequency components. The transformer 17 is coupled to an AC bus 18. Two identical, series-connected capacitor units 19 are connected between a first pole 20 and a second pole 21 on the DC side of the VSC 11 in order to provide a stiff DC voltage source. The midpoint between the two capacitor units 19 may be connected to ground. The DC voltage between the two poles 20 and 21 is symmetrically balanced between a positive voltage level $+U_{DC}$ and a negative level $-U_{DC}$. Accordingly, the DC potential at connection point 28 is zero. Since connection point 28 represents the AC phase terminal of VSC 11, it can be noted that no DC potential occurs on the AC side of VSC 11, i.e. the converter reactor 15, the harmonic filter 16 and the transformer 17 all "see" only a pure AC voltage.

The power conversion system according to FIG. 3 represents a very cost effective and good solution for comparatively lower power. If a higher power is required, it is known to use two or more series-connected converter bridges 22, as is shown in FIG. 4. This configuration results in a reduction of the power, and thereby of the switching voltage, per bridge 22, which reduces the switching losses of the VSC 23. Additionally, the switching frequency can be lowered since it becomes possible to switch between the bridges 22, as is for example described in DE 101 03 031 A1. The reduced switching frequency leads to the cancellation of lower order harmonics. In FIG. 4, the same arrangement of converter reactor 24, harmonic filter 25 and transformer 26 is used on the AC side of each of the bridges 22 as was used in case of the single bridge of FIG. 3. The AC side of bridges 22 is connected in parallel to AC bus 27. The converter reactors 24 and harmonic filters 25 are again needed in order to not expose the transformers 26 to the switching frequency. The disadvantage which such a configuration is that in case of n series-connected bridges also n converter reactors and n harmonic filters are needed which increases the costs considerably. Additionally it is to be noted that a DC potential occurs at the AC phase terminals 29 of bridges 22, since zero DC potential is now developed at the midpoint 30 between the two bridges 22. The midpoint 30 can also directly be connected to ground. This results in the necessity to design the transformers 26 for DC, i.e. no standard transformers can be used, which constitutes a further cost factor.

SUMMARY OF THE INVENTION

It is an object of the present invention to provide a high voltage AC/DC or DC/AC power conversion system according to the preamble of claim 1 which reduces the costs compared to the system described above.

The invention is based on the recognition of the fact that a capacitor which is connected in series with each of the reactors blocks the DC voltage from passing from the VSC to any equipment connected to an AC supply voltage on the AC side of the VSC, such as the transformers. Accordingly, a specific design of the transformers for DC is no longer required. Instead, standard transformers can be used which reduces the cost and effort when designing the power conversion system with series-connected converter valve bridges. It was further recognized that, since the DC voltage is blocked by the series-connected capacitors, the transformers of FIG. 4 can be omitted in those cases where no transformation of voltage levels is needed, i.e. where the AC supply voltage is already provided with the required voltage level. Usually, the DC transformers would perform the task of DC voltage isolation in addition to the voltage transformation.

If transformers are used which do not withstand high frequency, a harmonic filter in shunt-connection to the transformer will be needed, as described above. Another advantage of the capacitors in series to the converter reactors is the excellent high frequency performance of the capacitors which allows the passing of all of the high frequency components to just one common harmonic filter. The number of harmonic filters can therefore, according to a preferred embodiment, be decreased to one, which omits the additional filter costs compared to the configuration of FIG. 4. Accordingly, one common transformer can be used, reducing the costs even further. When only one harmonic filter and one transformer are used, at least two of the series connections of reactor and capacitor are connected in parallel with each other and their common connection point is then connected to the one transformer and the one harmonic filter.

In a further embodiment, the task of the converter reactor is split. At least a small converter reactor is always needed in direct connection to the AC phase terminal of each of the converter valve bridges. The rest of the task of blocking current harmonics can be performed by an additional reactor which is connected between the common connection point and the one transformer and harmonic filter.

The transformer can be a two winding or a three winding transformer. A three winding transformer is preferably used in case that the VSC comprises at least four series-connected converter valve bridges. Accordingly, at least four series connections of reactor and capacitor are connected to the AC phase terminals of the at least four bridges. The at least four series connections are parallel connected in two groups, and each of the two secondary windings of the transformer are then connected to the common connection point of one of the two groups.

According to a still further embodiment, the series capacitors are protected against overvoltage, which may for example occur in case of a short circuit, by connecting a surge arrester across each of the capacitors.

Regarding the dimensioning of the series capacitors, it is possible to choose them with a higher per-unit (p.u.) value then the corresponding converter reactor, since the control of the VSC ensures that the resulting reactive power will be absorbed by the VSC. For example, if the converter reactor has a value in the order of 0.15 p.u. The series capacitor can then have a value of around 0.3 p.u. when it is optimized economically. This means that the power conversion system will have an overall capacitive characteristic, the order of which is acceptable from a control point of view.

BRIEF DESCRIPTION OF THE DRAWINGS

The invention is now described by way of example with reference to the accompanying drawings in which.

DETAILED DESCRIPTION OF EMBODIMENTS OF THE INVENTION

Figure 1:
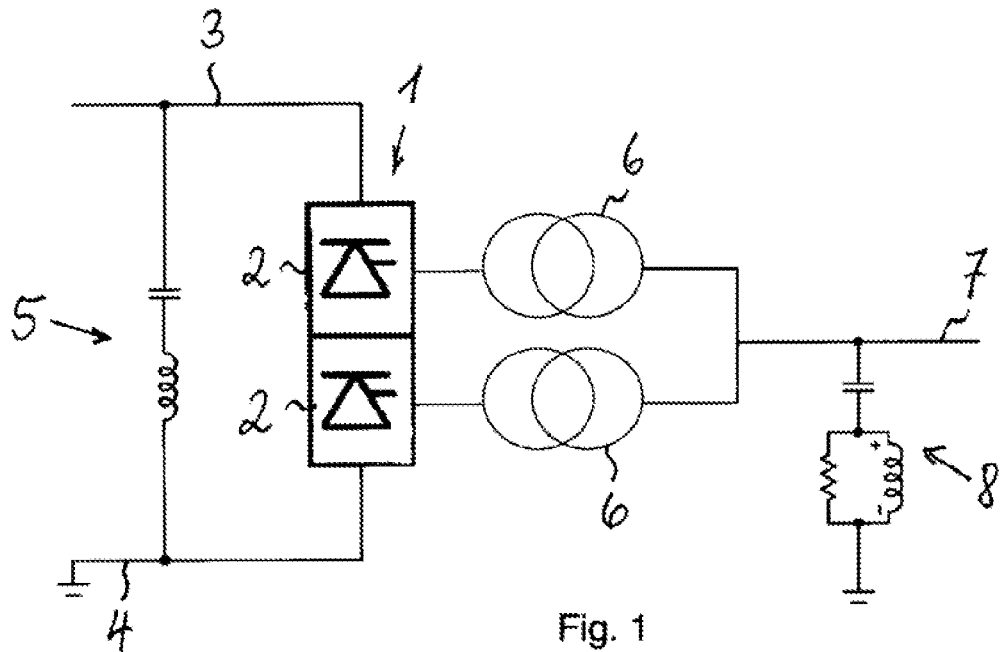
FIG. 1 shows a known power conversion system with CSC.
Figure 2:
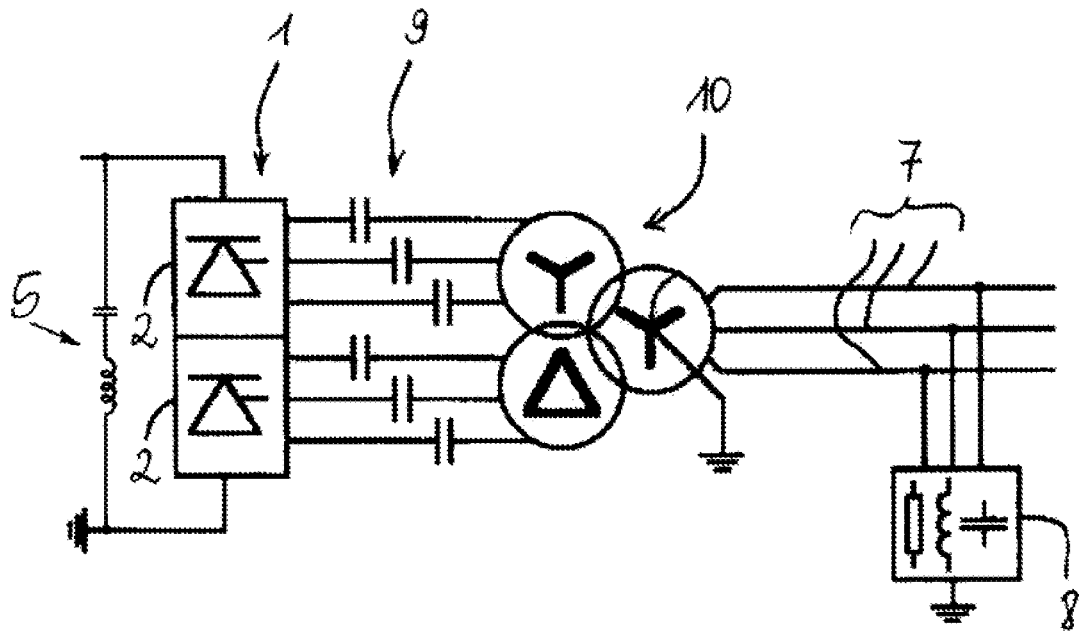
FIG. 2 shows another known power conversion system with CSC.
Figure 3:
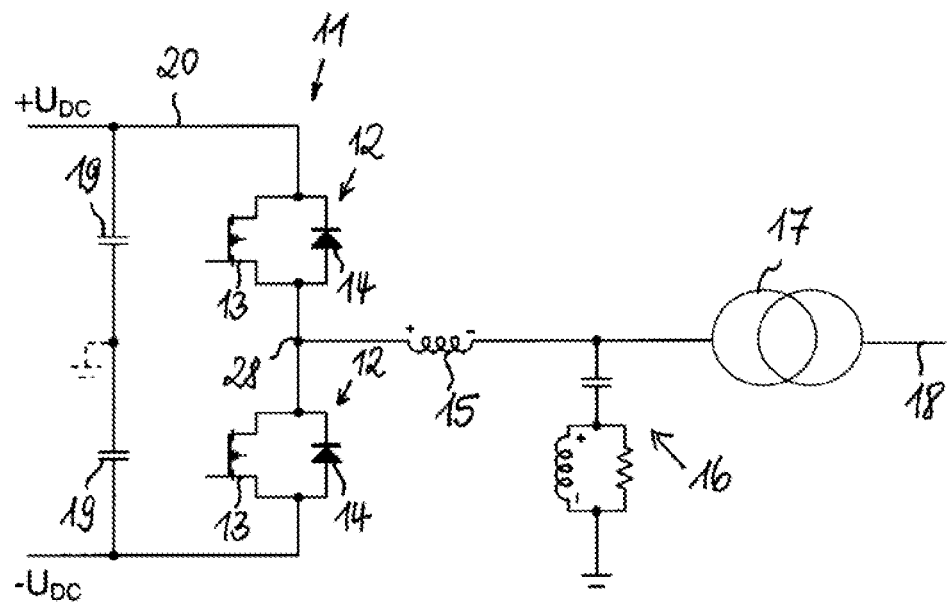
FIG. 3 shows a known power conversion system with VSC.
Figure 4:
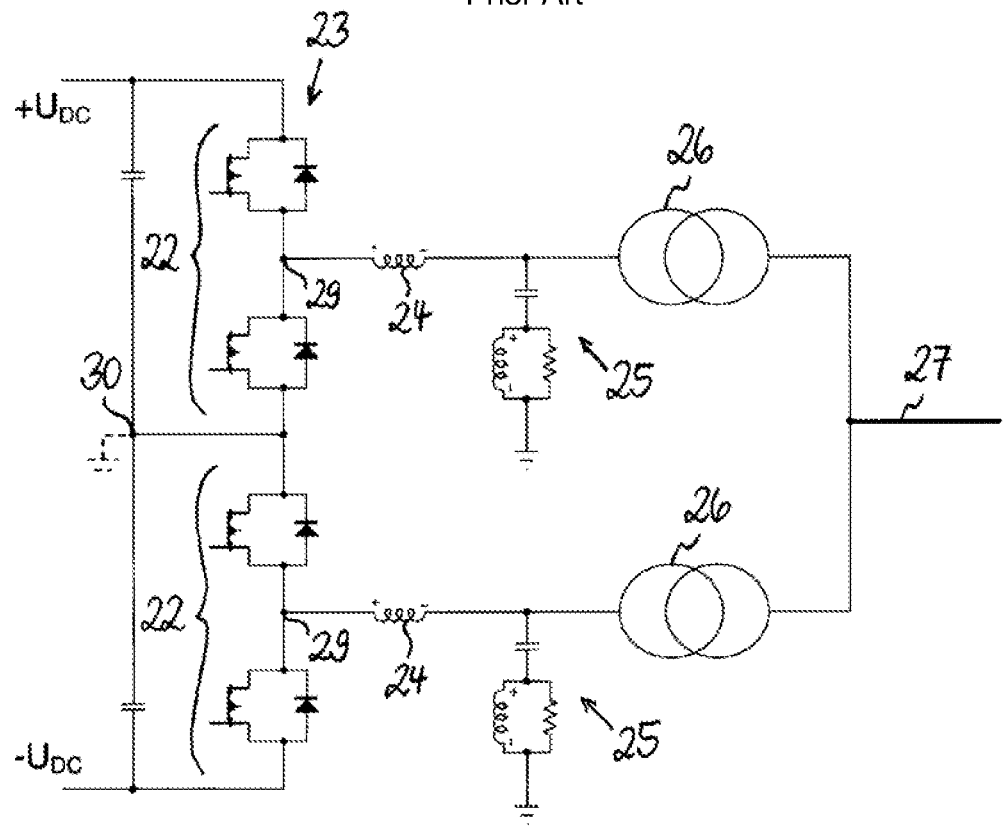
FIG. 4 shows a possible solution for a power conversion system with a multi-level VSC.
Figure 5:
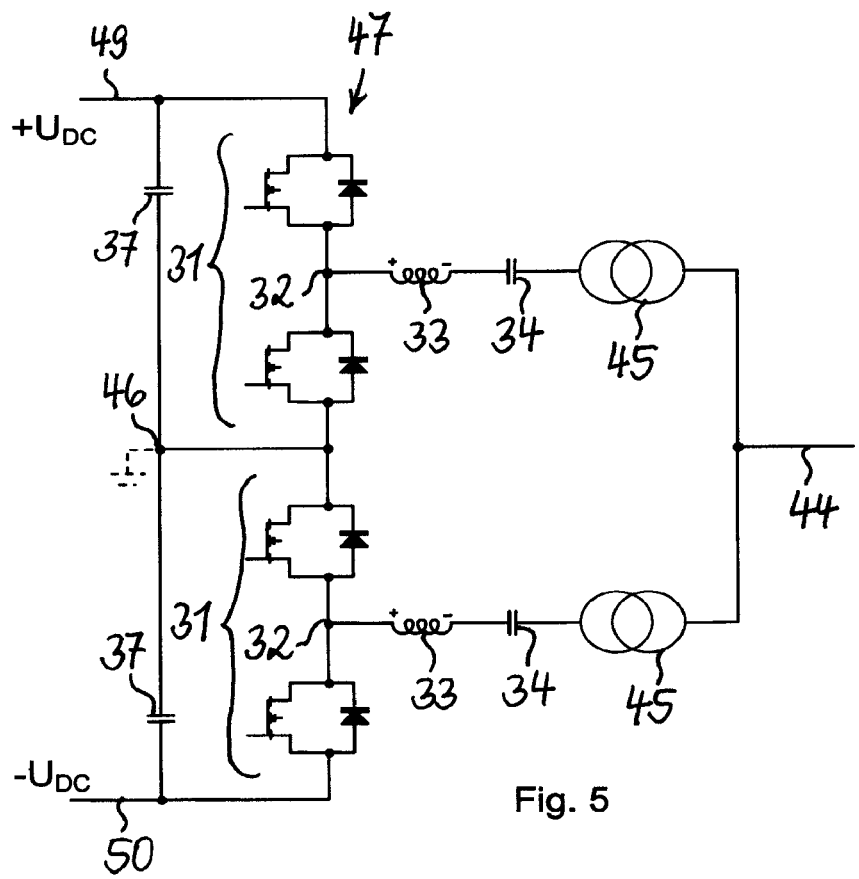
FIG. 5 shows a first embodiment of a power conversion system with a multi-level VSC and series capacitors.

FIG. 5 shows a first embodiment of a power conversion system with a multi-level VSC, in this case a VSC 47 with two series-connected converter valve bridges 31, where the system represents a considerable improvement compared to the system of FIG. 4. The major difference between the two systems lies in that the system of FIG. 5 comprises a capacitor 34 in series with each of the converter reactors 33. The capacitors 34 block the DC voltages which occur at the AC phase terminals 32 of the bridges 31 from passing to the transformers 45, so that standard transformers can be used. Zero DC voltage can be measured again at the midpoint 46 between the two bridges 31, and it is again possible to connect midpoint 46 directly to ground. Alternatively, it is also possible to operate VSC 47 in a way where one of the poles 49 or 50 is connected to ground and the other to a positive or negative DC voltage. This would result in different DC voltage levels on the AC phase terminals 32 than in the embodiment of FIG. 5, but the series capacitors 34 would again protect the transformers 45 from these DC potentials. It is assumed in the embodiment of FIG. 5 that the transformers 45 are able to withstand high frequency components caused by the switching of VSC 47, which are not smoothed out by the converter reactors 33. In that case, the harmonic filters 25 of FIG. 4 can be omitted. The series connections of converter reactor 33, capacitor 34 and transformer 45 are connected in parallel to an AC supply voltage provided via an AC bus 44.

Figure 6:
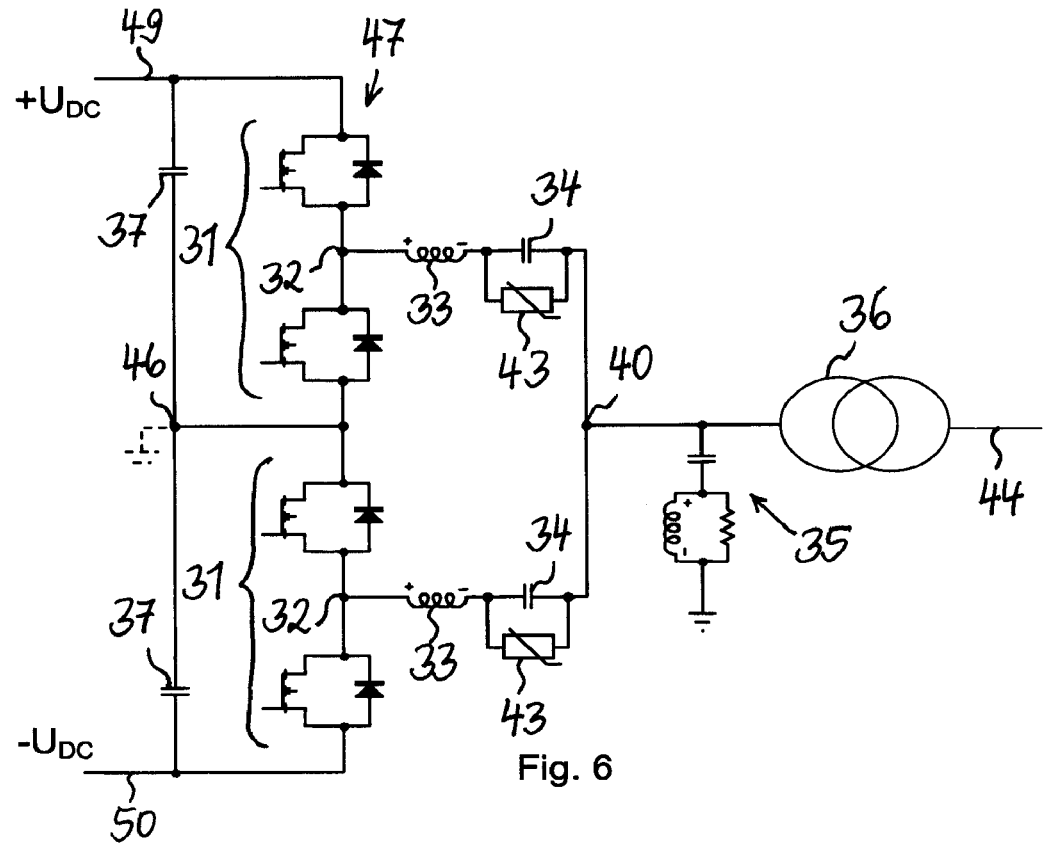
FIG. 6 shows a second embodiment of a power conversion system with a multi-level VSC and series capacitors.

In a second embodiment of a power conversion system with a multi-level VSC 47 and series capacitors 34, according to FIG. 6, a shunt-connected harmonic filter 35 is introduced. Due to the presence of the series capacitors 34, it is sufficient to have just one harmonic filter 35 to filter out the remaining high frequency components. The possible combination of the harmonic filters into just one filter results directly in the combination of the transformer 45 into one transformer 36. As is seen in FIG. 6, this reduction in components leads to a configuration, where the two series connections of converter reactor 33 and capacitor 34 are connected in parallel with each other and where the one transformer 36 and the one shunt-connect harmonic filter 35 are directly coupled to the common connection point 40 of the series connections. FIG. 6 shows additionally two surge arresters 43, each connected across one of the capacitors 34, which protect the capacitors 34 against overvoltage.

Figure 7:
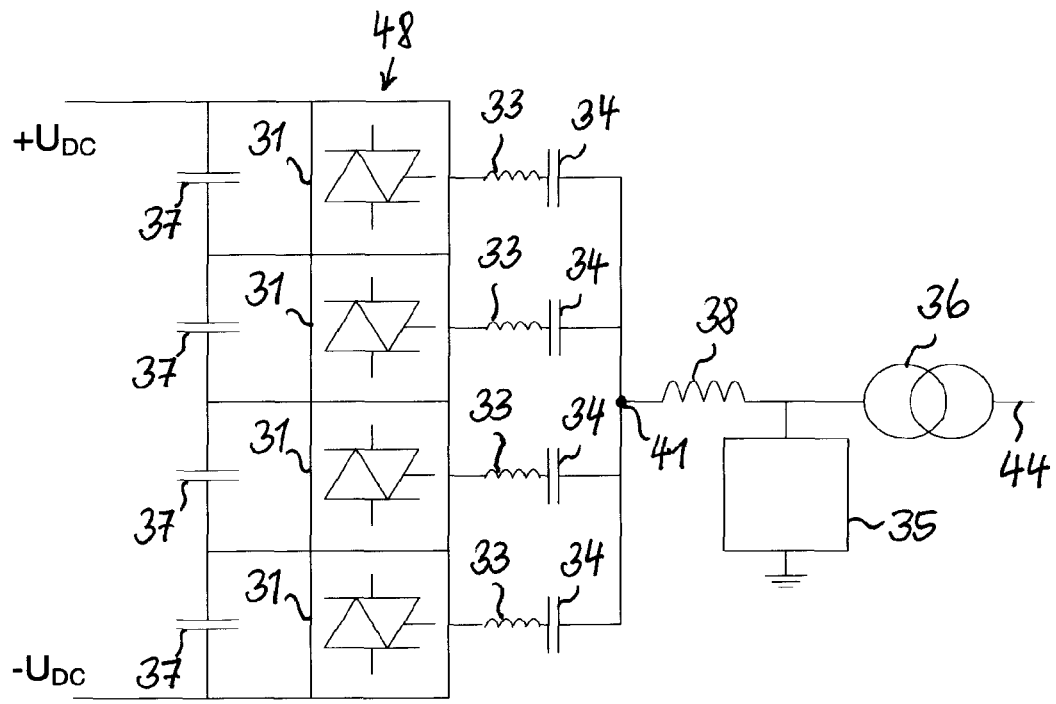
FIG. 7 shows a third embodiment of a power conversion system with a multi-level VSC and series capacitors.

A third embodiment of a power conversion system with a multi-level VSC 48 and series capacitors 34 is shown in FIG. 7. The VSC 48 comprises four series-connected converter valve bridges 31. All components which were already introduced with respect to FIG. 5 or 6 are marked with the same reference numbers. One series connection of converter reactor 33 and capacitor 34 is again connected to each of the AC phase terminals of the four bridges. The four series connections are all connected in parallel with each other and one harmonic filter 35 and one transformer 36 are coupled to the common connection point 41 via an additional reactor 38. The additional reactor 38 allows the reduction of converter reactors 33 in size, which results in a further cost reduction, especially with an increasing number of series connected bridges 31.

Figure 8:
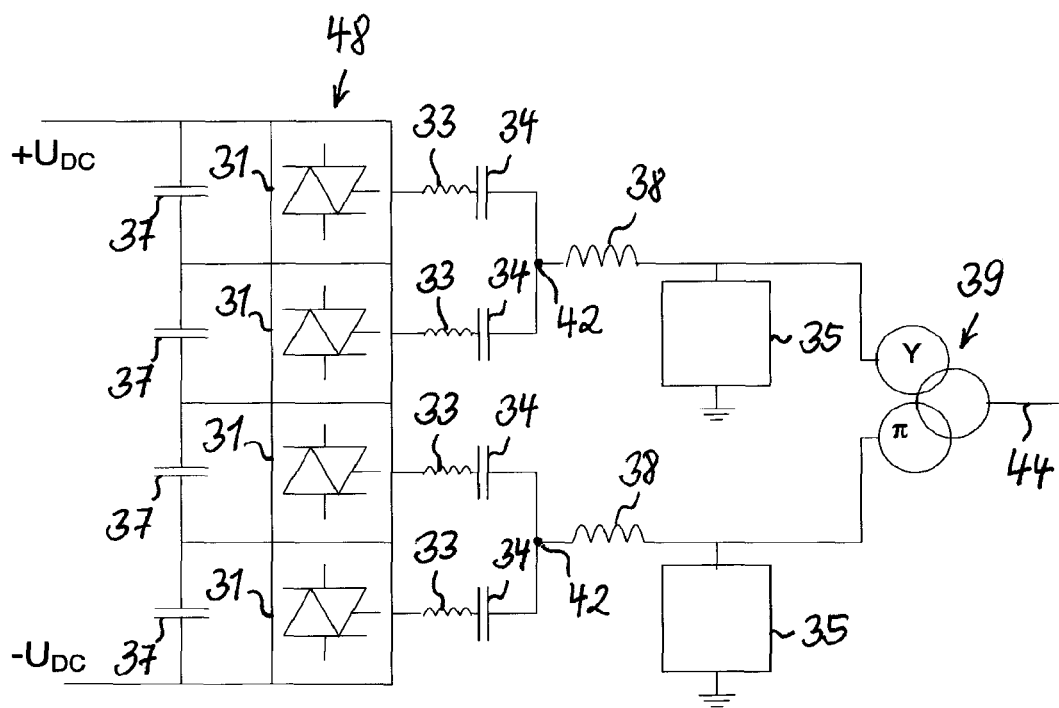
FIG. 8 shows a fourth embodiment of a power conversion system with a multi-level VSC and series capacitors.

The fourth embodiment of a power conversion system with a multi-level VSC 48 and series capacitors 34 according to FIG. 8, differs from the system of FIG. 7 in that two groups of parallel connected series connections of converter reactor 33 and capacitor 34 are established. Each group has a common connection point 42 and one harmonic filter 34 and one transformer 39 are coupled to each of these connection points 42 via an additional reactor 38. The one transformer 39 is a three-winding transformer and each of his secondary windings is coupled to one of the common connection points 42.

The invention claimed is:

1. A high voltage AC/DC or DC/AC power conversion system, comprising:
    a voltage source converter with at least two series-connected converter valve bridges,
    at least two reactors, wherein each of the at least two reactors is connected to an AC phase terminal of the at least two bridges,
    at least two capacitors, wherein each capacitor is connected in series with one of the at least two reactors, and
    at least one transformer connected to an AC supply voltage, wherein each of the at least two capacitors is connected between a corresponding reactor and the at least one transformer.

2. The system according to claim 1, further comprising:
    at least one harmonic filter shunt-connected to the at least one transformer.

3. The system according to claim 2, wherein at least two of the series connections of reactor and capacitor are connected in parallel with each other, and wherein a common connection point is connected to one transformer and one harmonic filter.

4. The system according to claim 3, wherein the common connection point is connected via an additional reactor to the one transformer and the at least one harmonic filter.

5. The system according to claim 1, wherein the at least one transformer is a two winding transformer.

6. The system according to claim 3, wherein the system comprises at least four series-connected converter valve bridges and at least four series connections of reactor and capacitor which are parallel connected in two groups, and wherein the at least one transformer is a three-winding transformer with each of two secondary windings being connected to the common connection point of one of the two groups or where a two-winding transformer is connected to each one of the two groups.

7. The system according to claim 1, further comprising:
    a surge arrester connected across each of the capacitors.

* * * * *